United States Patent [19]

Kojima et al.

[11] Patent Number: 5,754,136
[45] Date of Patent: May 19, 1998

[54] RESCUE AIDING APPARATUS AND SEARCH SYSTEM

[75] Inventors: Kouichi Kojima; Hirohisa Abe, both of Kyoto; Hiroyuki Jikuya, Tsukuba, all of Japan

[73] Assignee: Shimadzu Corporation, Kyoto, Japan

[21] Appl. No.: 717,718

[22] Filed: Sep. 23, 1996

[30] Foreign Application Priority Data

Sep. 26, 1995 [JP] Japan .................................. 7-247902
Jan. 31, 1996 [JP] Japan .................................. 8-039030

[51] Int. Cl.⁶ .................................................. G01S 5/02
[52] U.S. Cl. ........................ 342/357; 342/419; 342/450
[58] Field of Search ............................... 342/357, 457, 342/450, 419

[56] References Cited

U.S. PATENT DOCUMENTS

| | | | |
|---|---|---|---|
| 4,045,799 | 8/1977 | Dapiran | 343/113 PT |
| 4,476,469 | 10/1984 | Lander | 340/825.45 |
| 4,885,588 | 12/1989 | Kawakami | 342/51 |
| 4,903,243 | 2/1990 | Turner | 367/3 |
| 5,235,337 | 8/1993 | Clark et al. | 342/51 |
| 5,414,432 | 5/1995 | Penny et al. | 342/357 |
| 5,485,163 | 1/1996 | Singer et al. | 342/457 |
| 5,543,797 | 8/1996 | Hochstein et al. | 342/42 |

*Primary Examiner*—Thomas H. Tarcza
*Assistant Examiner*—Dao L. Phan
*Attorney, Agent, or Firm*—Nikaido, Marmelstein, Murray & Oram LLP

[57] ABSTRACT

A rescue aiding apparatus carried by a lost person includes a radio receiver for receiving a radio signal, a radio transmitter for transmitting a radio signal, and a power supply for supplying working power. When the radio receiver receives a radio search signal transmitted from a search party, the power supply supplies operating power to the radio transmitter. The apparatus thereby becomes fully operable, and the radio transmitter transmits a radio signal as a response signal for enabling a search for the lost person needing protection. Even when the lost person is unable to make a rescue request, the search party can, on their own will, place the rescue aiding apparatus carried by the lost person in a fully operable state to notify the search party of a current position of the lost person.

9 Claims, 7 Drawing Sheets

RESCUE AIDING APPARATUS AND SEARCH SYSTEM

BACKGROUND OF THE INVENTION

(1) Field of the Invention

This invention relates to a portable rescue aiding apparatus and a search system using this apparatus in operations for searching missing people in urgent need of protection. Such people may include senile poriomaniacs, demented persons, and people having met with disasters at sea or in the mountains.

(2) Description of the Related Art

One means available to a person for correctly grasping or confirming his or her own position (self-position) is the Navigation System with Time And Ranging/Global Positioning System (hereinafter referred to as GPS). This system has been developed by the U.S. Department of Defense, which uses 24 artificial satellites making a circle around the earth in approximately 12 hours, and five monitor stations and control stations. According to its fundamental positioning technique, radio waves are received from three or more GPS satellites, each radio wave containing orthogonal coordinates (x, y, z) of the satellite with reference to the earth serving as the origin, and time signals. The position of each satellite with respect to a position of signal reception is then determined along with a rectilinear distance of the satellite which is determined from a radio transmission rate or the like. The position of signal reception is derived with high precision from a relational equation based on triangulation. Where radio waves from four or more satellites are used, the same system enables confirmation of a three-dimensional position including an altitude. Thus, a user can ascertain an accurate self-position with high precision simply by carrying a special radio receiver. Originally developed for military purposes, this system has recently been opened to civilian demands and is increasingly used as a car navigation system, for example.

As an extension of the self-position detecting function described above, attempts have been made to use the system to speed up rescue operations. In these attempts, mountaineers or voyagers are equipped with a portable apparatus having the GPS function. In time of a disaster, a radio signal including data showing a self-position confirmed through the GPS function is transmitted to notify the self-position to the searchers.

However, the above searching method has a drawback that communication of a self-position or a rescue request is impossible if a person searched for is seriously wounded, unconscious, or in the worst case dead, or in the case of a demented person, senile poriomaniac or the like lacking in normal mental faculties. When a rescue request is made by a person other than a senile poriomaniac, a person involved in a mountain disaster, or the like, an accurate current position of the lost person cannot be determined until receipt of a communication from the lost person himself or herself. Otherwise, the search party is compelled to launch a wasteful and time-consuming search operation at random. It is thus difficult to expect a speedy and efficient search.

The search party may grasp the accurate current position of a lost person at any time if the apparatus is always in a perfect working condition constantly transmitting a radio signal indicating a self-position. However, the constant transmission of a radio signal requires a large power source (large battery), which is a serious setback to the portability of the apparatus.

SUMMARY OF THE INVENTION

This invention has been made having regard to the state of the art noted above, and its primary object is to provide a rescue aiding apparatus for allowing searchers, only on their own will, to grasp an accurate current position of a lost person, thereby to protect the lost person promptly, even when the lost person is unable to make a rescue request.

Another object of this invention is to provide a rescue aiding apparatus which fulfills the above primary object without impairing the portability of the apparatus.

A further object of this invention is to provide a rescue aiding apparatus for determining a position of a lost person promptly, and a search system using this rescue aiding apparatus.

A still further object of this invention is to provide a rescue aiding apparatus having a simplified construction for fulfilling the above primary object, and a search system using this rescue aiding apparatus.

The above objects are fulfilled, according to this invention, by a rescue aiding apparatus for aiding in an operation to search a lost person urgently needing protection, comprising a radio receiving device for receiving a radio signal transmitted as a search signal by a search party, and a radio transmitting device operable in response to the search signal for transmitting a radio signal as a response signal for enabling the operation to search the lost person.

The rescue aiding apparatus is carried by the lost person needing protection, and the radio receiving device of this apparatus receives a radio signal transmitted as a search signal (call signal) from the search party. Upon receipt of the search signal by the radio receiving device, the radio transmitting device automatically transmits a radio signal as a response signal for enabling a search for the lost person needing protection. By receiving the radio signal serving as a response signal (callback signal) from the lost person, the search party can grasp a current position of the lost person.

Thus, the above rescue aiding apparatus automatically transmits a response signal upon receipt of a search signal from the search party. Even when the lost person is unable to communicate a self-position by way of a rescue request, the search party can, on their own will, grasp a current position of the lost person for early protection.

As a specific construction for automatically transmitting a response signal upon receipt of a search signal from the search party, the rescue aiding apparatus may further comprise a power supply device for supplying operating power to the radio receiving device and the radio transmitting device, wherein the radio receiving device is operable in response to the search signal for outputting a control signal to the power supply device, and the power supply device, upon receipt of the control signal, supplies operating power to the radio transmitting device.

Thus, the radio receiving device outputs a control signal upon receipt of the search signal transmitted from the search party. Upon receipt of the control signal, the power supply device starts supplying operating power to the radio transmitting device, whereby the apparatus becomes fully operable. As a result, the radio transmitting device immediately transmits a response signal.

With the above construction, the rescue aiding apparatus need not be in a fully working state at all times. Thus, the apparatus need not be equipped with a large battery which would impair portability of the apparatus.

According to this invention, a plurality of rescue aiding apparatus may each have an individual ID code allocated thereto, and the search signal transmitted from the search party may include an ID code. Then, each rescue aiding apparatus is operable to transmit the response signal only when the ID code included in the search signal received agrees with the individual ID code allocated.

The search party transmits the search signal including the ID code allocated to the rescue aiding apparatus carried by the lost person under search. Then, a response signal is received only from the rescue aiding apparatus carried by that lost person (since rescue aiding apparatus having other ID codes do not transmit response signals because of ID code disagreement). Consequently, the search party is never distracted by response signals from irrelevant rescue aiding apparatus. The search party may search the lost person by accurately spotting his or her rescue aiding apparatus among a plurality of similar apparatus.

In a first form of the rescue aiding apparatus according to this invention, the radio transmitting device includes a self-position computing unit for deriving data corresponding to a self-position from radio wave signals transmitted from a plurality of radio wave transmitting stations, and a position data inclusive signal transmitting unit for outputting a radio signal including data indicative of the self-position provided by the self-position computing unit.

With this construction, the self-position computing unit of the radio transmitting device derives data corresponding to a self-position from radio wave signals transmitted from the plurality of radio wave transmitting stations, and the position data inclusive signal transmitting unit outputs a radio signal including data indicative of the self-position. The search party receives the response signal, and quickly determines a current position of the lost person from the data corresponding to the self-position included in the response signal.

In the first form of the rescue aiding apparatus, the plurality of radio wave transmitting stations may comprise at least three GPS (Global Positioning System) satellites, the self-position computing unit determining a self-position of the rescue aiding apparatus from radio wave signals transmitted from the GPS satellites.

That is, the three or more GPS satellites and the self-position computing unit constitute the Global Positioning System to determine a self-position of the rescue aiding apparatus.

Instead of using the GPS satellites, the radio wave transmitting stations may be installed at at least three different locations on land or at sea. Then, a self-position of the rescue aiding apparatus may be determined from radio wave signals transmitted from the radio wave transmitting stations, as in the Global Positioning System.

In a second form of the rescue aiding apparatus according to this invention, the radio transmitting device includes a position data exclusive signal transmitting unit for outputting a radio signal without data indicative of a self-position.

With this construction, the position data exclusive signal transmitting unit of the radio transmitting device transmits a radio signal as a response signal without data indicative of the self-position. The search party establishes a plurality of receiving sites, and determines a current position of the lost person from directions from which the response signal is transmitted (i.e. arrival directions of the response signal). According to this construction, the radio transmitting device simply outputs a radio signal not including self-position data. Thus, the apparatus is simplified to realize a cost reduction and improved portability thereof.

A search system using the first form of the rescue aiding apparatus comprises a radio communication station capable of radio communication with the rescue aiding apparatus, at least three radio wave transmitting stations for transmitting radio waves for use by the rescue aiding apparatus in computing a self-position, and an indicating device for indicating current position information on the lost person to the search party based on the data showing the self-position of the rescue aiding apparatus received at the radio communication station.

In searching a lost person, the search party transmits a search signal from the radio communication station. On the other hand, each radio wave transmitting station transmits a radio wave for use by the rescue aiding apparatus in computing a self-position. Upon receipt of the search signal, the rescue aiding apparatus automatically transmits a response signal. At this time, the rescue aiding apparatus derives a self-position from the radio waves received from the radio wave transmitting stations, and transmits the response signal including data showing the self-position. The radio communication station receives the response signal including data showing the self-position. The indicating device indicates the current position information on the lost person to the search party based on the data showing the self-position of the rescue aiding apparatus received by the radio communication station. Consequently, the search party grasps the current position of the lost person.

The indicating device and the radio communication station may be installed at the same location or at separate locations. Where the indicating device and the radio communication station are located remote from each other, they may be connected through a signal circuit such as a public telephone circuit.

The indicating device may include a portable terminal unit for indicating the current position information on the lost person to the search party, and a converting device for converting the current position information into a format presentable on the terminal unit based on the data showing the self-position of the rescue aiding apparatus received at the radio communication station.

When the radio communication station receives the response signal, the converting device converts the current position information into a format presentable on the terminal unit based on the data showing the self-position of the rescue aiding apparatus received at the radio communication station, and gives the information to the terminal unit. Based on the information received from the converting device, the terminal unit indicates the current position information on the lost person to the search party. With this construction, the search party may carry the terminal unit, approach the lost person while confirming the current position of the lost person, and protect the lost person.

A search system using the second form of the rescue aiding apparatus comprises a radio communication station for transmitting the search signal to the rescue aiding apparatus, two receiving devices installed at two locations spaced apart from each other, and including directional antennas, respectively, and an indicating device for measuring arrival directions of the response signal at the two locations based on reception by the receiving devices of the response signal from the rescue aiding apparatus, and indicating current position information on the lost person to the search party based on the arrival directions and a distance between the two locations.

In searching a lost person, the search party transmits a search signal from the radio communication station. Upon receipt of the search signal, the rescue aiding apparatus automatically transmits a response signal. The response signal is received by each of the two receiving devices installed at two locations spaced apart from each other, and including directional antennas, respectively. At this time, directions of the antennas of the receiving devices are varied to measure conditions of reception of the response signal. The arrival directions of the response signal are determined at the two locations where the receiving devices are installed, based on directions of the antennas in which the response signal is received in good condition. The indicating device indicates, to the search party, current position information on the lost person derived from the arrival directions of the response signal at the two locations and a distance between the two locations.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DESCRIPTION OF THE PREFERRED EMBODIMENTS

Figure 1:
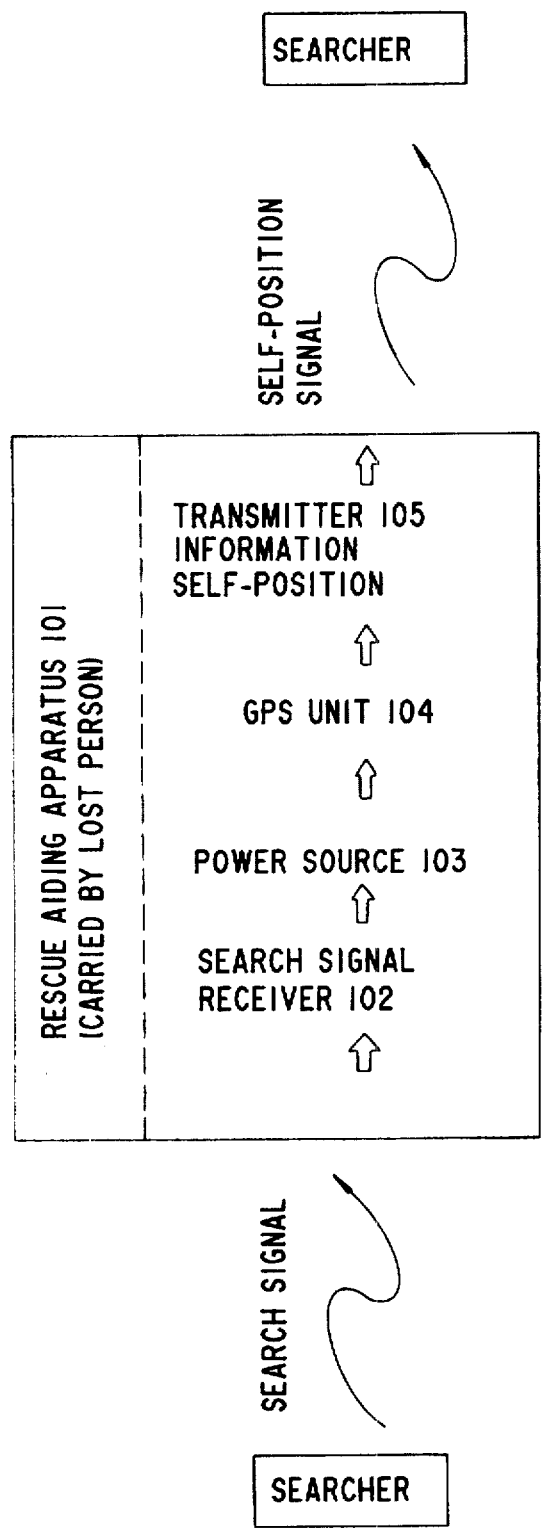
FIG. 1 is a block diagram showing an outline of a rescue aiding apparatus in a first embodiment of this invention.

Preferred embodiments of this invention will be described in detail hereinafter with reference to the drawings.

First Embodiment

An outline of a rescue aiding apparatus in a first embodiment of this invention will be described with reference to FIG. 1.

When a person is missing, such as a senile poriomaniac or demented person unable to return home or a mountaineer in a disaster (hereinafter referred to as a "lost person"), a member of his or her family or other searcher first transmits a search signal by radio. The lost person carries a rescue aiding apparatus 101. If the lost person is within reach of a radio signal, a search signal receiver 102 of the rescue aiding apparatus 101 automatically receives the search signal. Then, the search signal receiver 102 automatically turns on a power source 103 to supply electric power to the entire apparatus. A GPS unit 104 is thereby driven to detect and demodulate spectrum-spread signals from GPS satellites to obtain navigation data. In this way, the GPS unit 104 measures distances from the satellites to compute a self-position automatically. The self-position computed is passed on to a self-position information transmitter 105. The self-position information transmitter 105 converts information such as a longitude, latitude and altitude of the current self-position into a communicable signal, and transmits the self-position information by public VHF radio or the like. The search party obtains correct information on the position of the lost person by receiving the callback signal from the rescue aiding apparatus 101 carried by the lost person, and starts a rescue operation promptly.

Next, the apparatus in the first embodiment shown in FIG. 1 will be described in greater detail with reference to FIG. 2.

Figure 2:
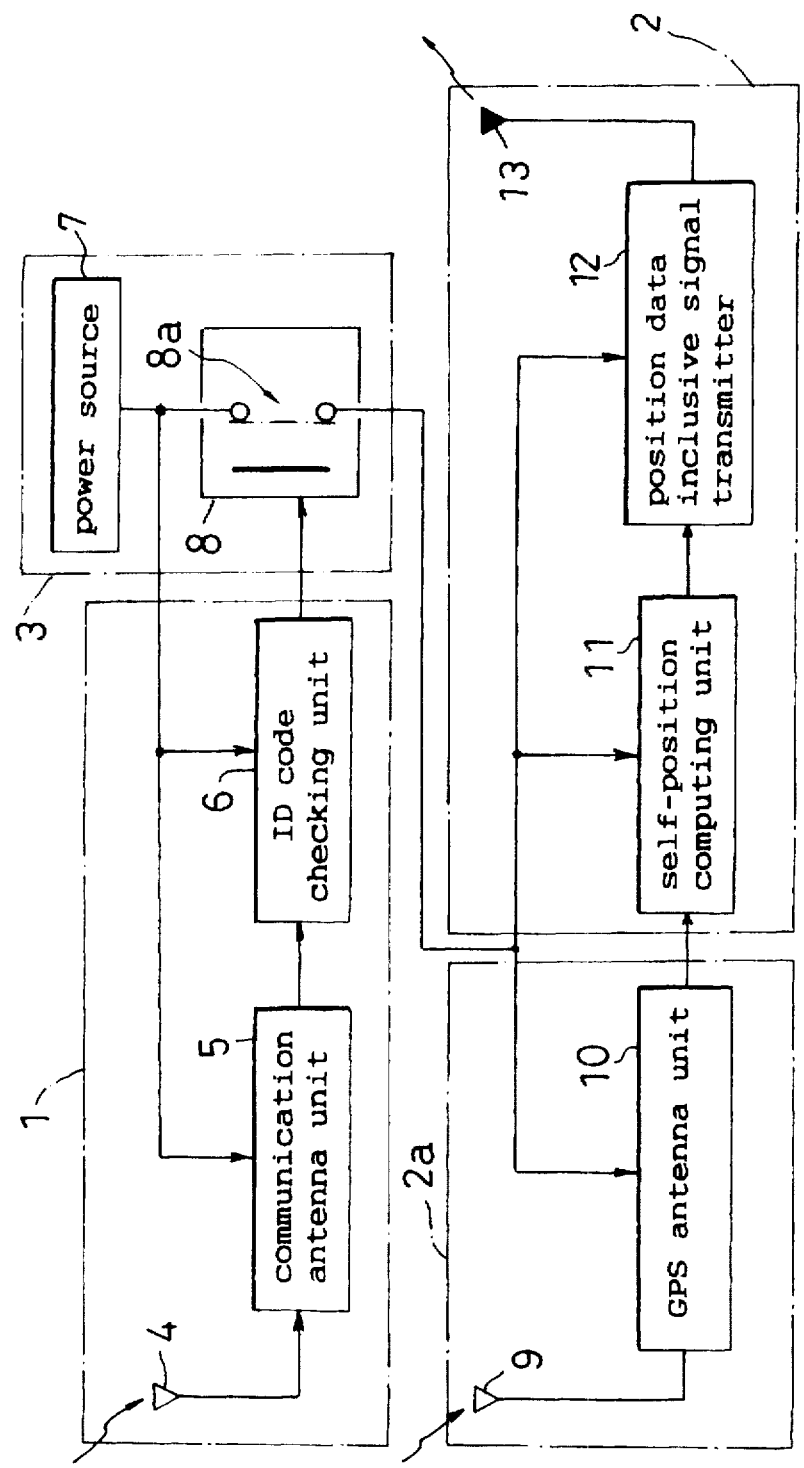
FIG. 2 is a block diagram showing details of the apparatus in the first embodiment.

The rescue aiding apparatus shown in FIG. 2 includes a radio receiver (radio receiving device) 1 for receiving a radio signal transmitted as a search signal from the search party, a radio transmitter (radio transmitting device) 2 for transmitting a radio signal as a response signal to enable a search of the lost person, and a power supply device 3 for supplying operating power to the radio transmitter 2 in response to a control signal from the radio receiver 1. An electric wave receiver 2a is disposed upstream of the radio transmitter 2.

The radio receiver 1 in FIG. 2 corresponds to the search signal receiver 102 in FIG. 1. The power supply device 3 in FIG. 2 corresponds to a power source 103 in FIG. 1. The electric wave receiver 2a and a self-position computing unit 11 of the radio transmitter 2 in FIG. 2 correspond to the GPS unit 104 in FIG. 1. A position data inclusive signal transmitter 12 and a transmitting antenna 13 of the radio transmitter 2 in FIG. 2 correspond to the self-position information transmitter 105 in FIG. 1. In FIG. 2, the self-position computing unit 11 is included in the radio transmitter 2 for expediency. There is no profound meaning in the classification of this component.

Each component will particularly be described hereinafter.

The radio receiver 1 includes a communication antenna unit 5 having a planar receiving antenna 4 for catching a search signal from the search party, and an ID code checking unit 6. The search signal transmitted from the searcher includes an ID code allocated to the associated rescue aiding apparatus to distinguish its carrier from numerous other carriers. The search signal received by the receiving antenna 4 is preamplified and detected by the communication antenna unit 5, and passed on to the ID code checking unit 6. The ID code checking unit 6 checks if the ID code in the search signal received agrees with the ID code of the rescue aiding apparatus. The checking unit 6 outputs a control signal upon agreement between the ID codes, but does not if the ID codes disagree.

The power supply 3 includes a battery type power source 7 and a switch 8. The switch 8 has contacts 8a which are closed in response to the control signal outputted from the ID code checking unit 6 after receipt of the search signal. When the contacts 8a are closed as shown in a dot-and-dash line in FIG. 2, the operating power is supplied from the power source 7 to the radio transmitter 2 and electric wave receiver 2a. Thus, even if the lost person fails to operate the apparatus to make a rescue request, the search signal from the search party closes the contacts 8a to place the rescue aiding apparatus in a fully working state.

The radio receiver 1 must be ready to receive a search signal at all times, and therefore operating power is constantly supplied thereto. However, the constant supply of operating power presents no problem since the radio receiver 1 consumes only a small amount of power. Where necessary, the rescue aiding apparatus may include an additional switch for closing the contacts 8a, so that the lost person himself or herself may place the apparatus in the fully working state.

The electric wave receiver 2a includes a GPS antenna unit 10 having a planar receiving antenna 9 for catching radio waves from GPS satellites. The GPS antenna unit 10 preamplifies and detects spectrum-spread radio waves from GPS satellites received by the receiving antenna 9, and outputs the radio waves to the radio transmitter 2.

The radio transmitter 2 includes the self-position computing unit 11, position data inclusive signal transmitter 12 and transmitting antenna 13. The transmitting antenna 13 and receiving antenna 4 may be integrated into one antenna. The self-position computing unit 11 demodulates the signals inputted thereto from the GPS antenna unit 10, to obtain navigation data and measure distances from the plurality of satellites, to compute a self-position automatically, and outputs data showing the self-position to the position data inclusive signal transmitter 12. The position data inclusive signal transmitter 12 automatically transmits, from the transmitting antenna 13, a radio signal as a response signal including the data showing the self-position obtained from self-position computing unit 11. The data showing the self-position (position information) includes at least a latitude and a longitude of the current position of the rescue aiding apparatus (i.e. the lost person), and may also include altitude information as necessary. The radio signal is transmitted by VHF radio or the like.

The radio waves received by the electric wave receiver 2a are not limited to the radio waves from GPS satellites.

Radio wave transmitting stations may be installed at three or more different locations on land or at sea for transmitting reference radio waves for use in self-position computations, and these radio wave transmitting stations may be used in place of GPS satellites. For example, three, four or more reference radio wave transmitting stations are installed at three appropriate locations in a particular mountainous region (four or more such stations enabling determination an altitude of a lost person), and each mountaineer carries a rescue aiding apparatus. If one mountaineer meets with a disaster, the search signal transmitted from his or her search party operates the rescue aiding apparatus. Based on the radio waves from the reference radio wave transmitting stations, the rescue aiding apparatus may compute data showing a self-position of the lost person.

Since the reference radio wave transmitting stations installed on land or at sea are fixed to the earth, the orthogonal coordinates, with the earth serving as the origin, of each reference radio wave transmitting station are already known. Each reference radio wave transmitting station transmits a reference radio wave including its own position information and time signal. The rescue aiding apparatus computes a self-position based on such reference radio waves, in the same way as in the Global Positioning System using GPS satellites.

Where the response signal includes data showing a self-position as noted above, the rescue aiding apparatus need not transmit the response signal constantly. It is adequate to transmit the response signal intermittently. The light source (battery) 7 may be small for allowing the apparatus to be used over a long period of time and to transmit strong response signals.

Next, an operation of the above apparatus will be described with reference to FIG. 3 which shows a search system for searching a lost person needing protection.

Figure 3:
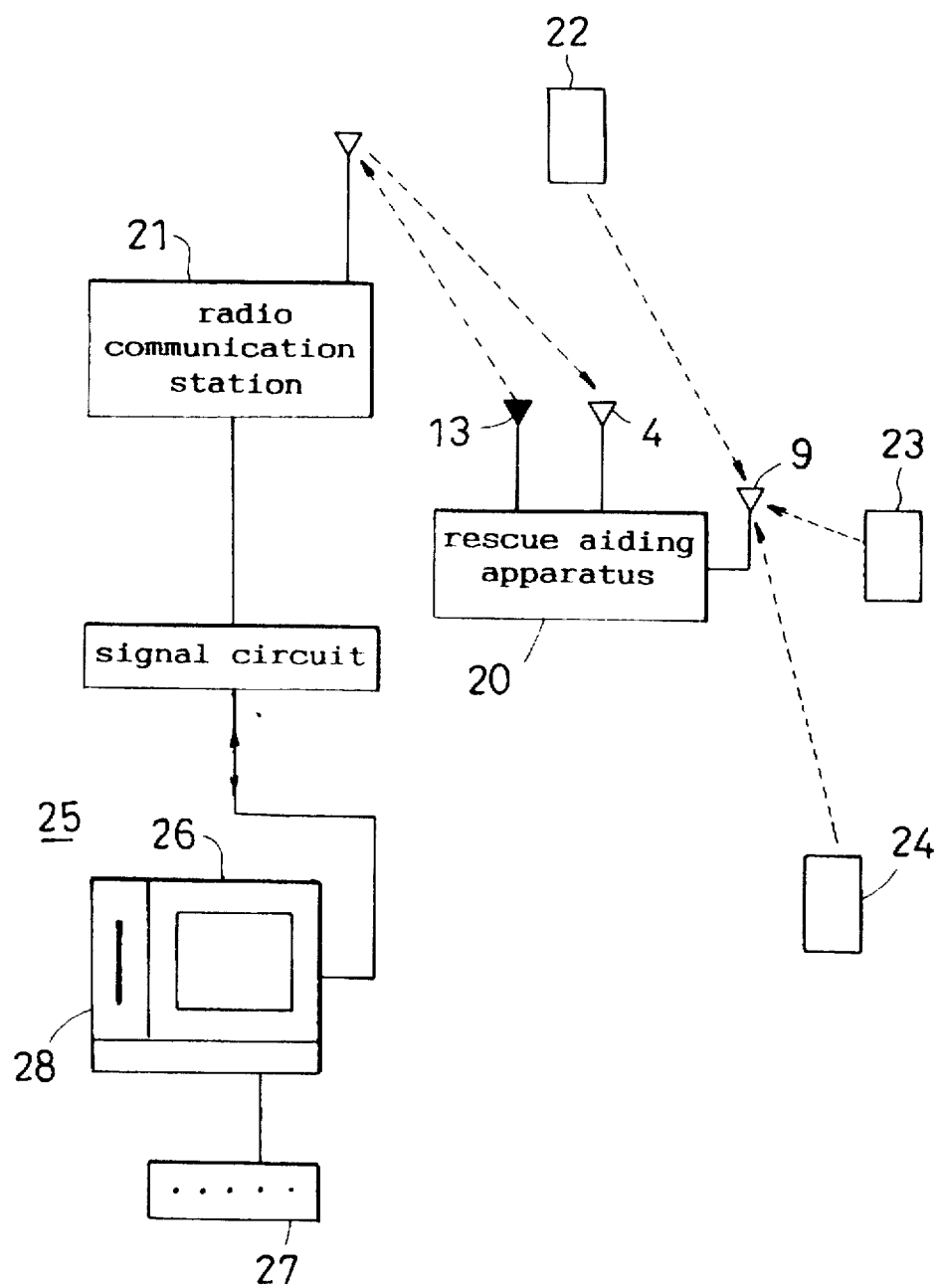
FIG. 3 is a block diagram of a search system using the apparatus in the first embodiment.
Figure 4:
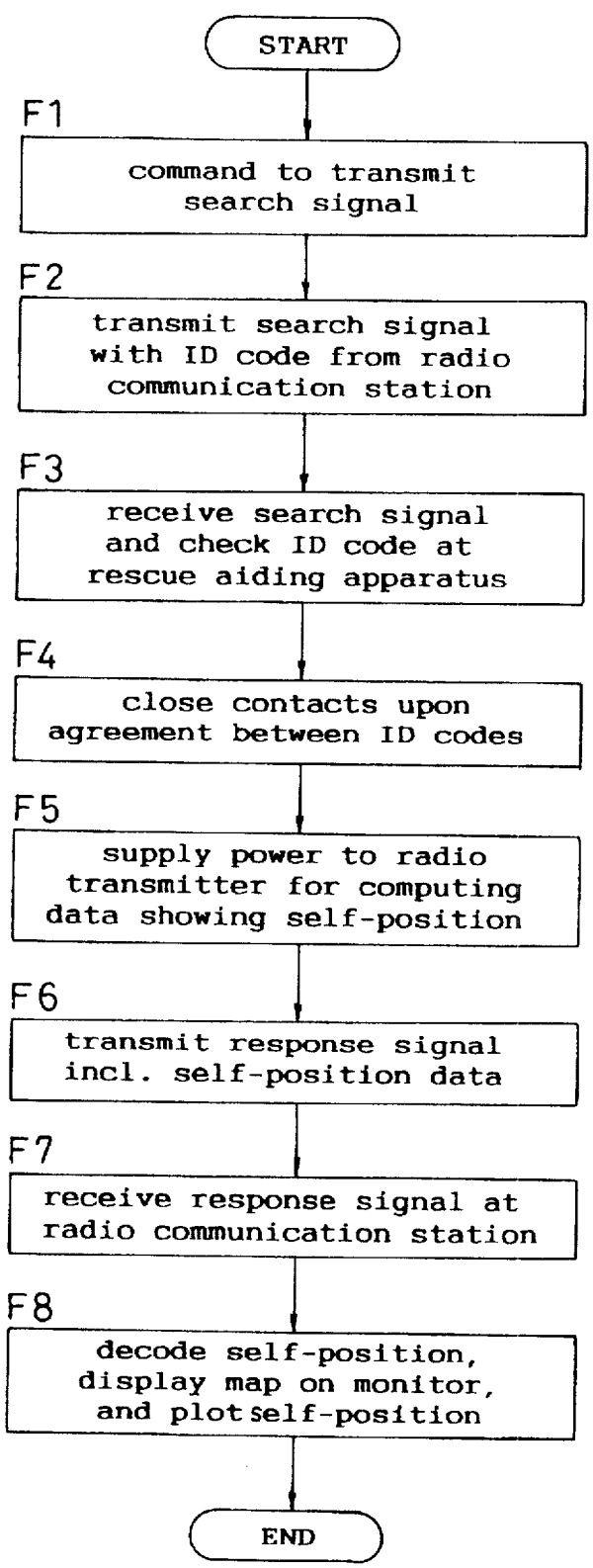
FIG. 4 is a flow chart of a search operation in the first embodiment.

As shown in FIG. 3, the lost person carries a rescue aiding apparatus 20 capable, as is a portable telephone, of radio communication with a radio communication station (local base station) 21. The apparatus 20 is also capable of receiving radio waves transmitted from reference radio wave transmitting stations 22–24 for use in computing a self-position. The radio communication station 21 is connected through a signal circuit (e.g. a public telephone circuit) to a control/display device (indicating device) 25 installed at a search headquarters. The control/display device 25 is a personal computer type device having a monitor 26, a control board 27 and a disk drive 28. When a search for a lost person is required, a search operation is conducted according to the flow chart shown in FIG. 4. It is to be noted here that the reference radio wave transmitting stations 22–24 are GPS satellites or stations installed on land or at sea.

[Step F1] The control board 27 of the control/display device 25 is operated to input a command to transmit a search signal including an ID code.

[Step F2] The command to transmit a search signal including an ID code is delivered through the signal circuit to the radio communication station 21. The radio communication station 21 transmits a radio signal with the ID code as a search signal.

[Step F3] The search signal is caught by the receiving antenna 4 of the rescue aiding apparatus 20. The ID code checking unit 6 checks the ID code.

[Step F4] Nothing happens if the ID code is found inapplicable. If the ID code indicates this apparatus, a control signal is outputted immediately to close the contacts 8a of the switch 8.

[Step F5] Power is supplied when the contacts 8a of the switch 8 are closed, and the electric wave receiver 2a and radio transmitter 2 begin to operate. That is, the rescue aiding apparatus 20 is now in the fully working state. At the same time, the radio waves from the reference radio wave transmitting stations 22–24 are caught by the receiving antenna 9 and inputted to the self-position computing unit 11. The computing unit 11 derives, from the radio waves, data showing a self-position such as a latitude, a longitude and (in the case of four or more reference radio wave transmitting stations) an altitude of the lost person.

[Step F6] A radio signal including the data showing the self-position (e.g. latitude, longitude and altitude) is transmitted as a response signal from the transmitting antenna 13.

[Step F7] The radio communication station 21 receives the response signal from the transmitting antenna 13, and transmits the signal through the signal circuit to the control/display device 25.

[Step F8] The control/display device 25 decodes the data showing the self-position, reads a corresponding map from a CD-ROM in the disk drive 28, displays a map of the current location of the lost person on the monitor 26, and plots the current position of the lost person. Then, the search party grasps the current position of the lost person. Naturally, the latitude, longitude and altitude may be shown in numerals on the monitor 26, or converted into an address to be displayed in characters.

The radio communication station 21 and control/display device 25 may be installed at the same location or at separate locations. Further, the functions of the radio communication station 21 and control/display device 25 may be combined.

Second Embodiment

Next, an apparatus in the second embodiment of this invention will be described in detail with reference to FIG. 5.

Figure 5:
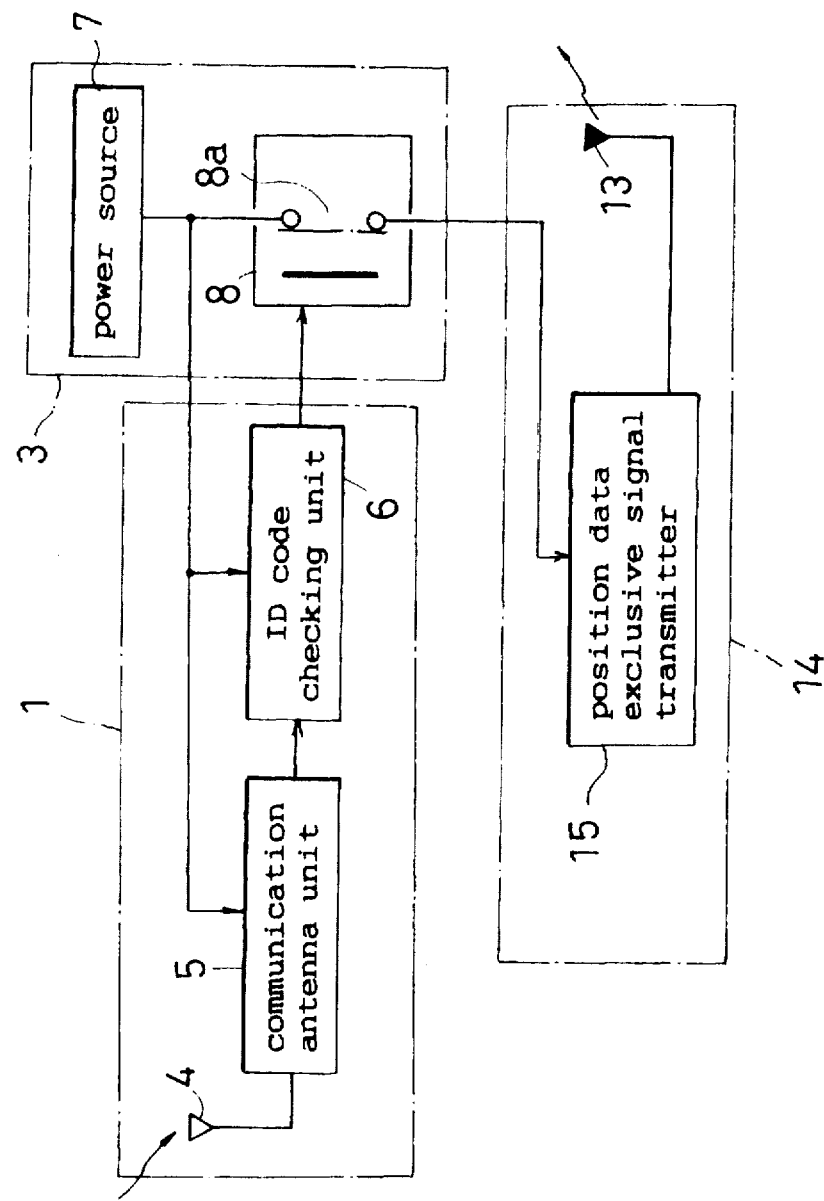
FIG. 5 is a block diagram showing an entire rescue aiding apparatus in a second embodiment of this invention.

In the apparatus shown in FIG. 5, the radio receiver 1 and power supply 3 are the same in construction and function as those shown in FIG. 2. That is, the apparatus in the second embodiment also is operable even when the lost person is unable to operate the apparatus to make a rescue request. The search party may transmit a search signal which closes the contacts 8a to place the rescue aiding apparatus in the fully working state. This aspect will not be described again. The apparatus shown in FIG. 5 includes a radio transmitter 14 having a self-position data exclusive signal transmitter 15 for transmitting a mere radio signal, i.e. a self-position data exclusive signal not including data showing a self-position (position information). This apparatus has a construction simplified by omitting the electric wave receiver 2a and self-position computing unit 11 included in the apparatus shown in FIG. 2.

Figure 6:
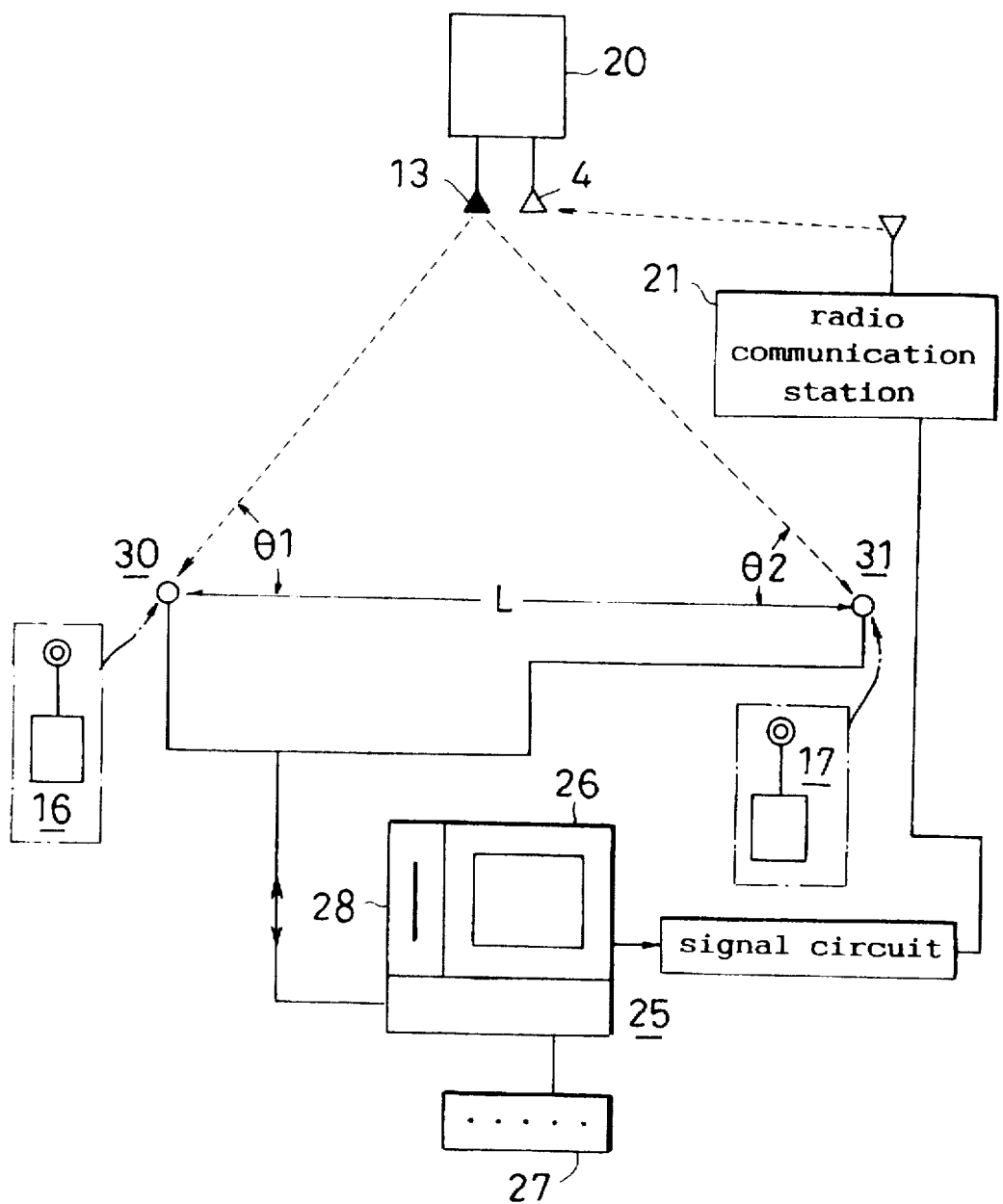
FIG. 6 is a block diagram of a search system using the apparatus in the second embodiment.

With the apparatus shown in FIG. 5, though simple in construction, its response signal must be received at two or more locations for searching a lost person needing protection. In a search system as shown in FIG. 6, for example, while the control board 27 of the control/display device 25 is operable to input a command to transmit a search signal including an ID code, receiving devices 16 and 17 having directional antennas are installed at two locations 30 and 31 considerably spaced to opposite sides from the control/display device 25. The control/display device 25, based on response signal receiving conditions inputted from the two receiving devices 16 and 17, measures arrival directions (arrival angles θ1 and θ2) of the response signal at the two locations 30 and 31. A triangle is plotted on the monitor 26 based on a distance L between the two locations and the arrival angles θ1 and θ2 of the response signal. Then, the apex of the triangle corresponds to the current position of the lost person. In parallel therewith, the control/display device 25 may read a corresponding map from a CD-ROM in the disk drive 28, and display the map along with the triangle on the monitor 26. Further, since the locations of the two receiving devices 16 and 17 are known, it is possible to determine geographical position data of the current position of the lost person. Thus, the geographical position data of the current position of the lost person may be displayed directly on the monitor 26. The geographical data may be converted into an address to be displayed in characters on the monitor 26.

It is to be noted that the response signal is to be transmitted continually over a period of time to allow determination of arrival angles θ1 and θ2.

Figure 7:
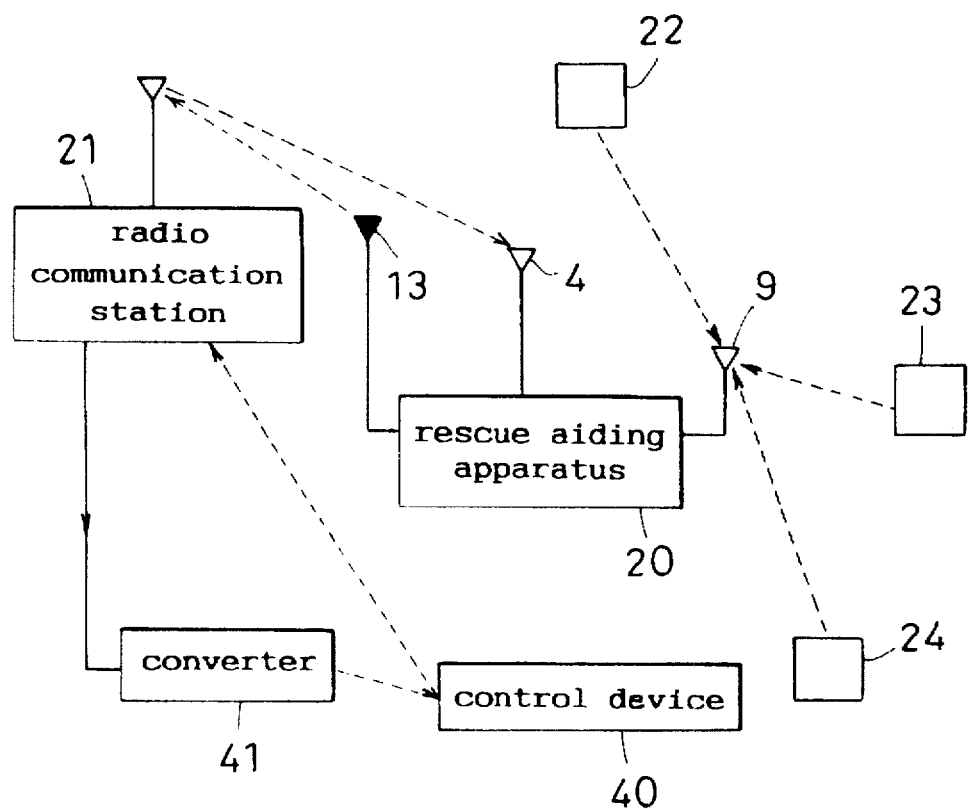
FIG. 7 is a block diagram of a modified search system.

The foregoing embodiments may be modified as follows:

(1) A small-scale search system as shown in FIG. 7 may be used instead of the search system having the sophisticated control/display device 25 shown in FIG. 3. Specifically, the search system may include a portable control device (terminal unit) 40 similar to a portable telephone. A search signal is transmitted simply by operating pushbuttons of the control device 40. A converter (converting device) 41 decodes data showing a self-position, and converts a longitude and latitude into a specific address. The control device (portable telephone) 40 may give the search party the information showing the current position of a lost person in voice to facilitate understanding. This search system may be said to be useful to ordinary households when a demented person is missing, for example. The converter 41 and radio communication station 21 may be installed at the same location or at separate locations. Where they are located at locations remote from each other, data may be communicated through a signal circuit such as a public telephone circuit. The converter 41 may be incorporated into the radio communication station 21. Further, the control device 40 may be provided as an extension to the search system shown in FIG. 3, with the control/display device 25 having the function of the converter 41, so that the search party may obtain position information of a lost person from the control device 40. The above modification is applicable also to the search system employing the apparatus in the second embodiment.

(2) In the rescue aiding apparatus shown in FIG. 2, the operating power is supplied to the electric wave receiver 2a after receipt of a search signal. Since the electric wave receiver 2a also consumes very little power, the operating power may be supplied constantly thereto. Thus, only the radio transmitter 2 may receive the power supply after receipt of a search signal.

The present invention may be embodied in other specific forms without departing from the spirit or essential attributes thereof and, accordingly, reference should be made to the appended claims, rather than to the foregoing specification, as indicating the scope of the invention.

What is claimed is:

1. A rescue aiding apparatus for aiding in an operation to search a lost person urgently needing protection, comprising:

radio receiving means for receiving a radio signal transmitted as a search signal by a search party; and radio transmitting means operable in response to said search signal for transmitting a radio signal as a response signal for enabling said operation to search said lost person;

wherein said radio transmitting means includes self-position computing means for deriving data corresponding to a self-position from radio wave signals transmitted from a plurality of radio wave transmitting stations, and position data inclusive signal transmitting means for outputting a radio signal including data indicative of said self-position provided by said self-position computing means.

2. A rescue aiding apparatus as defined in claim 1, further comprising power supply means for supplying operating power to said radio receiving means and said radio transmitting means, wherein said radio receiving means is operable in response to said search signal for outputting a control signal to said power supply means, and said power supply means, upon receipt of said control signal, supplies operating power to said radio transmitting means.

3. A rescue aiding apparatus as defined in claim 1, wherein said rescue aiding apparatus has an individual ID code allocated thereto, and said search signal transmitted from said search party includes an ID code, said rescue aiding apparatus being operable to transmit said response signal only when said ID code included in said search signal received agrees with said individual ID code allocated.

4. A rescue aiding apparatus as defined in claim 1, wherein said plurality of radio wave transmitting stations comprise at least three GPS (Global Positioning System) satellites, said self-position computing means determining a self-position of said rescue aiding apparatus from radio wave signals transmitted from said GPS satellites.

5. A rescue aiding apparatus as defined in claim 1, wherein said plurality of radio wave transmitting stations are installed at at least three different locations on land or at sea, said self-position computing means determining a self-position of said rescue aiding apparatus from radio wave signals transmitted from said radio wave transmitting stations.

6. A search system using a rescue aiding apparatus as defined in claim 1, comprising:

a radio communication station capable of radio communication with said rescue aiding apparatus;

at least three radio wave transmitting stations for transmitting radio waves for use by said rescue aiding apparatus in computing a self-position; and indicator means for indicating current position information on said lost person to said search party based on said data showing said self-position of said rescue aiding apparatus received at said radio communication station.

7. A search system as defined in claim 6, wherein said indicator means is connected to said radio communication station through a signal circuit.

8. A search system as defined in claim 6, wherein said indicator means includes portable terminal means for indicating said current position information on said lost person to said search party, and converting means for converting said current position information into a format presentable on said terminal means based on said data showing said self-position of said rescue aiding apparatus received at said radio communication station.

9. A search system comprising:

rescue aiding means including a radio receiver for receiving a radio signal transmitted as a search signal by a search party, and a radio transmitter operable in response to said search signal for transmitting a radio signal as a response signal for enabling an operation to search a lost person, said radio transmitter including position data exclusive signal transmitting means for outputting a radio signal without data indicative of a self-position;

a radio communication station for transmitting said search signal to said rescue aiding means;

two receiving means installed at two locations spaced apart from each other, and including directional antennas, respectively; and indicator means for measuring arrival directions of said response signal at said two locations based on reception by said receiving means of said response signal from said rescue aiding means, and indicating current position information on said lost person to said search party based on said arrival directions and a distance between said two locations.

\* \* \* \* \*